2
United States Patent [19]

Sturgis

[11] Patent Number: 4,996,175
[45] Date of Patent: Feb. 26, 1991

[54] REFRACTORY COMPOSITION AND METHOD FOR METAL CASTING

[75] Inventor: David H. Sturgis, Gladstone, Oreg.

[73] Assignee: Precision Castparts Corp., Portland, Oreg.

[21] Appl. No.: 148,010

[22] Filed: Jan. 25, 1988

[51] Int. Cl.$^5$ ............................................. C04B 35/50
[52] U.S. Cl. ..................................... 501/126; 501/152
[58] Field of Search ................................. 501/126, 152

[56] References Cited

U.S. PATENT DOCUMENTS

| | | | |
|---|---|---|---|
| 3,545,987 | 12/1970 | Anderson | 501/152 |
| 3,873,657 | 3/1975 | Toda et al. | 501/152 |
| 3,955,616 | 5/1976 | Gigliotti, Jr. et al. | 164/361 |
| 4,063,954 | 12/1977 | Brown | 164/23 |
| 4,115,134 | 9/1978 | Rhodes | 501/152 |
| 4,166,831 | 9/1979 | Rhodes et al. | 501/152 |
| 4,174,973 | 11/1979 | Rhodes et al. | 501/152 |
| 4,407,970 | 10/1983 | Komatsu et al. | 501/98 |
| 4,578,487 | 3/1986 | Barfurth et al. | 556/40 |
| 4,703,806 | 11/1987 | Lassow et al. | 154/518 |
| 4,787,439 | 11/1988 | Feagin | 164/518 |
| 4,799,532 | 1/1989 | Mizuhara | 164/47 |

FOREIGN PATENT DOCUMENTS

| | | | |
|---|---|---|---|
| 60-195055 | 10/1985 | Japan | 501/152 |
| 530731 | 5/1975 | U.S.S.R. | 322/164 |

OTHER PUBLICATIONS

Calvert, E. D., "An Investment Mold for Titanium Casting", Bureau of Mines Report of Investigation No. 8541 (1981).
Helferich, R. L. et al., "An Investigation of Yttrium Oxide as a Crucible Material for Melting Titanium", Dept. of Navy, Naval Ship Research & Development Center, Jan. 1973, Report 3911.
"Third Interim Technical Report Development of Titanium Alloy Casting Technology", Airesearch Mfg. Co. of Ariz., Jan. 1975.
Feagin, R. C., "Casting of Reactive Metals into Ceramic Molds", Sixth World Conference on Investment Casting (date unknown).
"Development of Titanium Alloy Casting Technology", Airesearch Manufacturing Company of Arizona, Aug. 1976.
Searle, Alfred B., "Refractory Materials: Their Manufacture and Uses", Charles Griffin & Co., Ltd., London, England, p. 122 (1917).
Searle, Alfred B., "Refractory Materials: Their Manufacture and Uses", Charles Griffin & Co., Ltd., London, England, 2nd Ed., pp. 194-196 (1924).
Norton, F. H., "Refractories", McGraw-Hill Book Company, Inc., 3rd Ed., pp. 302-339 (1949).

*Primary Examiner*—William R. Dixon, Jr.
*Assistant Examiner*—Anthony J. Green
*Attorney, Agent, or Firm*—Klarquist, Sparkman, Campbell, Leigh & Whinston

[57] ABSTRACT

A method and process for producing a yttrium oxide metal casting refractory composition is disclosed. Powdered $Y_2O_3$ is combined with a sintering agent (preferably $V_2O_5$) and an organic binder. The mixture is sintered and ground to produce a stable $Y_2O_3$ flour. The flour is added to another binder having specific $SiO_2$, hydrolysis and viscosity levels in order to produce a slurry. Slurries prepared in accordance with the invention avoid problems traditionally associated with $Y_2O_3$ hydration and/or carbonation, and have long storage lives. In addition, the material costs associated with the slurries are low in comparison with products using fused $Y_2O_3$. The $Y_2O_3$ slurries may also find application as solid preformed cores formed by any conventional injection molding, transfer molding, or slurry casting process.

19 Claims, No Drawings

REFRACTORY COMPOSITION AND METHOD FOR METAL CASTING

BACKGROUND OF THE INVENTION

The present invention generally relates to a metal casting composition and method, and more specifically to a refractory composition and method using yttrium oxide characterized by improved stability and lower material costs.

Yttrium oxide ($Y_2O_3$) is an important and useful metal casting refractory. It is thermodynamically stable in the presence of most reactive engineering metals including titanium, titanium alloys, and columbium (niobium). A general discussion of $Y_2O_3$ in metal casting processes is presented in Calvert, E.D., "An Investment Mold For Titanium Casting", United States Department of the Interior (Bureau of Mines), Report of Investigations No. 8541, 1981: and Feagin, R. C., "Casting of Reactive Metals into Ceramic Molds", Report of Sixth World Conference on Investment Casting, pp. 4:01–4:13, 1984.

However, the total effectiveness of $Y_2O_3$ as a metal casting refractory is limited because of its affinity for moisture and carbon dioxide. Contamination of $Y_2O_3$ with $CO_2$ results in the formation of chemically undesirable yttrium carbonates. Hydration of $Y_2O_3$ forms yttrium hydroxides which have a high pH. Increases in pH cause most binder systems commonly used in conjunction with $Y_2O_3$ to gel and/or experience very short useful lives.

The hydration/carbonation problems described above are primarily caused by the finely-divided character of commercially available $Y_2O_3$. Most commercial $Y_2O_3$ is supplied in the form of a fine powder or flour having an average particle size of approximately 2 microns or less. As a result, there is a great amount of exposed surface area where hydration/carbonation can occur.

One method for eliminating the problems associated with finely-divided $Y_2O_3$ involves the use of chemically fused $Y_2O_3$ which is ground to a particle size distribution more suitable for use in investment casting slurries. However, the cost of fused $Y_2O_3$ is high (usually about 70–100% greater than the unfused product).

The present invention involves a method for using and producing a stable $Y_2O_3$ refractory composition which avoids the problems described above. It uses economical, readily available starting materials and is especially useful in large-scale casting operations, as described in greater detail below.

SUMMARY OF THE INVENTION

It is an object of the present invention to provide a refractory method and composition for metal casting which is highly efficient and economical.

It is another object of the invention to provide a refractory method and composition for metal casting which utilizes materials having reduced susceptibility to hydration and/or carbonation.

It is another object of the invention to provide a refractory method and composition for metal casting wherein the composition is capable of maintaining a relatively stable, acidic pH.

It is a further object of the invention to provide a refractory method and composition for metal casting which uses relatively inexpensive, readily available starting materials.

It is a still further object of the invention to provide a refractory method and composition for metal casting which is especially useful in both investment and ceramic core casting processes.

In accordance with the foregoing objects, the present invention involves a method and process for producing a metal casting refractory composition which is highly efficient, economical, and stable. Commercially available, powdered yttrium oxide ($Y_2O_3$) is first combined with a dopant material preferably consisting of vanadium pentoxide ($V_2O_5$) which functions as a sintering agent. The $V_2O_3$ allows sintering of the $Y_2O_3$ at temperatures lower than those normally required in the absence of $V_2O_3$. In addition to the $Y_2O_3$ and $V_2O_5$ an organic binder is added, followed by agglomeration of the mixture which further enhances the sintering process. The resulting mixture is then sintered at a suitable temperature level over a selected period of time in order to produce a final product consisting of dense, sintered agglomerates which are then ground to produce a flour. To make a casting slurry, the flour is combined with a partially hydrolyzed ethyl silicate binder having a specific viscosity, silica ($SiO_2$) content, and hydrolysis level. A viscosity adjusting agent may be incorporated in the binder in order to ensure that the proper viscosity is attained. The resulting slurry is highly efficient and economical as a casting refractory in both investment and core casting processes. It is also characterized by a long storage life and resistance to gellation.

These and other objects, advantages, and features of the invention will be described below in the following detailed description of a preferred embodiment and accompanying examples.

DETAILED DESCRIPTION OF A PREFERRED EMBODIMENT

The present invention involves an improved metal casting refractory method and composition using $Y_2O_3$. Production of the composition normally involves a two stage procedure in which a $Y_2O_3$ "flour" is first prepared.

Thereafter, the flour is converted to a slurry suitable for metal casting processes.

YTTRIUM OXIDE FLOUR PRODUCTION

To produce a suitable $Y_2O_3$ flour, commercially available $Y_2O_3$ is used which may be obtained from MolyCorp, Inc. of White Plains, N.Y. Normally, this material has an extremely fine texture with a particle size of less than two microns.

As previously described, the finely-divided character of commercially available $Y_2O_3$, results in hydration problems and/or the formation of undesired carbonate side products. The particle size of the $Y_2O_3$ must therefore be increased in order to avoid these problems. One approach has involved the use of "fused" $Y_2O_3$. Fusion of the $Y_2O_3$ involves heating it above its melting point to produce a liquid product. Thereafter, the product is cooled, re-crystallized and ground to a more desirable particle size distribution. Fused $Y_2O_3$ is commercially available but is very expensive.

To avoid the high costs associated with fused $Y_2O_3$, the present invention uses "sintered" $Y_2O_3$. Sintering traditionally involves the consolidation of an aggregate of fine particles upon heating at temperatures below the melting point of the composition. In the present invention, sintering consolidates the $Y_2O_3$ powder, agglomerates the $Y_2O_3$ into a solid mass, and promotes $Y_2O_3$ crystalline growth.

In order to economically produce sintered $Y_2O_3$, a sintering agent is added. Suggested sintering agents usable in the invention include MgO, $Cr_2O_3$, $Nb_2O_5$, and $V_2O_5$, with $V_2O_5$ being preferred. $V_2O_5$ is commercially available from the Foote Mineral Co. of Exton, Penna., and is preferable because it forms a low melting point eutectic composition with $Y_2O_3$ which has been verified through phase diagram studies.

Finally, a "fugitive" binder is added to the $V_2O_5$ and $Y_2O_3$ to produce a homogenized, agglomerated product. The term "fugitive" is used because the binder is entirely eliminated from the composition during sintering. It is preferred that the binder be organic, with exemplary binders including methyl cellulose, polyvinyl alcohol and a microcellulose composition sold under the name Avice TM grade pH 101) by the FMC Co. of Philadelphia, Penna.

After preparation of the mixture, it is further processed prior to sintering. For example, it may be agglomerated by methods known in the art (including dry pressing or wet extrusion), followed by excess moisture removal (if necessary). A method for dry pressing the mixture which is usable in the invention involves processing the mixture in a conventional tabletting machine, as described below in Example I.

Thereafter, the mixture is sintered at a temperature of about 2950–3350° F. for about two to six hours. When sintering is completed, the product is crushed and ground to a desired particle size. Typically, the average particle size of the product should range from about 5.0 to 10.0 microns with a specific surface area of 0.2 to 1.8 $M^2/g$ (preferred=0.8 $M^2/g$). Within these ranges, larger sized particles are sometimes preferred for preformed solid core casting and core coating operations.

The resulting flour has a broad particle size distribution, and will function in a manner similar to compositions using fused $Y_2O_3$. In addition, the flour will not be subject to the hydration problems described above, thereby ensuring that a low pH is maintained in the system. This, in turn, prevents binder gelling problems normally encounted with high pH levels. Prior to sintering, the composition will contain about 97.00 to 99.35% by weight $Y_2O_3$ (98.00% preferred), about 0.15 to 1.00% by weight $V_2O_3$ (0.25% preferred), and about 0.50 to 2.0% by weight binder (1.75% preferred). After sintering, none of the binder remains.

The flour is very stable and has been stored for one year without loss of effectiveness. To further illustrate the production of $Y_2O_3$ flours in accordance with the invention, the following examples are provided:

EXAMPLE I

| Component | Weight Percent of Composition |
| --- | --- |
| (1) $Y_2O_3$ (MolyCorp Co.- Grade 5600) | 78.110 |
| (2) Powdered $V_2O_5$ (Foote Mineral Co. - 99.8% pure) | 0.020 |
| (3) Polyvinyl alcohol solution (4.8% alcohol by wt.) | 18.750 |
| (4) Water | 3.120 |
| | 100.00 |

The $Y_2O_3$ and $V_2O_5$ were first dry blended for approximately five minutes in an industrial-type rotating blade mixer. Thereafter, the polyvinyl alcohol solution and water were added to the mixture and blended for another ten minutes. The product was dried at approximately 80° C. in a convection oven to remove excess moisture. After drying, the product was introduced into a tableting machine capable of generating pressures of between 5,000 and 10,000 psi which produced tablets 0.5 inches in diameter and 0.25 inches thick. The resulting tablets were then sintered in a kiln at approximately 2950° F. for four hours. Thereafter, the sintered tablets were crushed in a conventional roll crushing apparatus, pulverized in a disc pulverizer and ground to a desired size in a vibratory mill (5.0 –10.0 microns average particle size; specific surface area of 0.2 to 1.8 $M^2/g$).

EXAMPLE II

| Component | Weight Percent of Composition |
| --- | --- |
| (1) $Y_2O_3$ (MolyCorp Co. - Grade 5600) | 73.00 |
| (2) Powdered $V_2O_5$ (Foote Mineral Co. - 99.8% pure) | 0.25 |
| (3) Methyl Cellulose Powder | 1.75 |
| (4) Water | 25.00 |
| | 100.00 |

The $Y_2O_3$, $V_2O_5$ and methyl cellulose were dry blended for approximately five minutes in an industrial twin cone or other suitable mixer. Thereafter, the dry mixture was further mixed with the water in an industrial high shear mixer (sigma blade type). Next, the product was extruded to form small pellets (⅛" to ¼" in diameter and ¼" to 1" long) which were subsequently dried at 80° C in a convection oven. The dried pellets were then sintered at 2950° F. for four hours, pulverized in a disc pulverizer and ground to a desired size (see previous example) in a vibratory mill.

SLURRY PRODUCTION

In order to produce a composition suitable for metal casting, a slurry is formed from the $Y_2O_3$ flour described above. To make the slurry, the $Y_2O_3$ flour is combined with a selected quantity of a slurry binder. Slurry binders usable in the invention include those containing ethyl silicate. For example, an exemplary binder is prepared from the controlled hydrolysis of a composition called ethyl silicate 40 (tetraethyl ortho silicate) which contains 40% $SiO_2$, and is available from the Stauffer Chemical Company of Stamford, Conn.

Binders used to form the slurry should have a hydrolysis level of less than about 100%, but not less than about 60%, with about 75% being preferred. Within this range, a binder having maximum binding capacity and longevity will be produced.

Hydrolysis of the silicate binder normally involves the addition of water. However, in order for this to occur, a mutual solvent must be added to enhance miscibility of the materials. A solvent usable for this purpose is dipropylene glycol monomethyl ether sold under the name Dowanol TM by the Dow Chemical Co. of Midland, Mich. This material also functions as a moisture loss control agent. In order to catalyze the hydrolysis process described above, an acid is added (e.g. HC1) to the mixture.

The binder used to form the slurry should also have a $SiO_2$ level less than about 23.0% (with about 12.0% being preferred) in order to ensure minimal reactivity between the mold and metals being used.

Finally, the binder should have a viscosity of about 5.0–15.0 centipoise (with about 8.0 centipoise being preferred). The binder viscosity is very important because it affects drainage of the slurry from the molds, as well as other production parameters. To accomplish suitable viscosity adjustment, suitable thickening agents may be incorporated into the binder during the hydrolysis reaction, including cellulosic materials such as hydroxypropyl cellulose which is available under the tradename Klucel TM from the Hercules Chemical Co. of Wilmington, Del. Normally, the thickening agents should comprise about 0.1 to 1.0% by weight of the binder.

The $Y_2O_3$ flour is then added to the binder (preferably in about a 7:1 weight ratio), and mixed until a homogenized product is obtained. The completed slurry may either be used directly, or stored for future use. The slurry is cooled to about 45° F. for storage and mold dipping purposes, although the processing of molds may be performed at room temperature (about 70° F.). In addition to storing the slurry at reduced temperatures, it is preferred then the stored slurry be maintained in a $N_2$, or Ar atmosphere in order to prevent hydration of the product.

Slurries produced in accordance with the invention have long storage lives. They have been stored for up to 17 weeks prior to use without loss of effectiveness.

Before the slurry is used, its viscosity should be adjusted to 10–25 seconds (Zahn #4 cup) with a dry coating thickness of 2.0–5.0 mil. This is desired in order to ensure proper drainage of the slurry during use. The selective addition of solvents to the slurry may be used to accomplish viscosity adjustment. These solvents would include ethanol and/or dipropylene glycol monomethyl ether. Also, adjustment of the flour:binder ratio may be used to achieve viscosity control.

The following example illustrates a slurry prepared in accordance with the present invention:

EXAMPLE III

| Component | Weight Percent of Binder |
|---|---|
| Ethyl Silicate - 40 | 30.00 |
| Dipropylene Glycol Monomethyl Ether (Dowanol ® PM) | 67.113 |
| Deionized $H_2O$ | 2.478 |
| Hydroxypropl cellulose (Klucel (G) ®) | 0.300 |
| Conc. HCl | 0.109 |
| | 100.00% |

(Viscosity = approx. 8.0 centipoise)

This binder was combined with a $Y_2O_3$ flour prepared as described above in Examples I or II having a specific surface area of 0.8 $M^2/g$ with an average particle size of 6.0 microns. The $Y_2O_3$ flour was added to the binder in a 7.0:1.0 ratio. The resulting slurry had a viscosity of 24 seconds (Zahn #4 Cup), a pH of 5.1, and a coating thickness (dry) of 3.0 mil.

Slurries prepared in accordance with the invention may be used effectively in conjunction with conventional casting shell fabrication processes. For example, a wax pattern is first immersed in the slurry, followed by drainage of the pattern. The slurry on the pattern is then stuccoed with one of several fused refractory grains (e.g. alumina, zirconia, yttria, etc.). The pattern and slurry are then dried for about 6.0 hours. After drying, the pattern may be subjected to an ammonia gas gellation step which involves exposure of the slurry to ammonia gas. After ammonia gellation, the pattern is dried for another 6.0 hours, followed by the application of additional coats of backup shell until a desired mold thickness is reached. Finally, the mold is dewaxed, fired, and cast using reactive metal casting techniques known in the art.

The slurry may also be used in conjunction with traditional core casting techniques in which a ceramic core is coated with the slurry, followed by firing of the core. The yttria flour of the present invention may also be used in producing solid yttria preformed cores via any of the conventional methods commonly used in the industry. These processes would include injection molding, transfer molding and slurry casting using conventional binder systems and techniques. For example, a $Y_2O_3$ flour prepared as described above could be combined with an aqueous or non-aqueous binder known in the art (e.g. tetraethyl ortho silicate) to produce a mixture suitable for molding to form a solid core. The mixture would preferably consist of about 80–90% $Y_2O_3$ flour and about 10–20% binder.

Having described herein a preferred embodiment, it is anticipated that suitable modifications may be made by those skilled in the art within the scope of the invention. Accordingly, the invention shall only be construed in accordance with the following claims.

What is claimed is:

1. A method for producing a casting flour usable in a reactive metal casting slurry, the method comprising:
    forming a mixture which consists essentially of $Y_2O_3$ casting refractory powder as the predominant ingredient, $V_2O_5$ in an amount sufficient that said mixture has a lower sintering temperature than said powder, and a fugitive binder in an amount sufficient to maintain the mixture in a homogeneous state;
    applying heat to said mixture in an amount sufficient to sinter said mixture; and
    grinding the sintered mixture to form a casting flour.

2. The method of claim 1 wherein said fugitive binder is selected from the group consisting of polyvinyl alcohol and methyl cellulose.

3. A casting flour made according to the method of claim 1.

4. A method for producing a composition usable in a reactive metal casting slurry, the method comprising:
    forming a mixture which consists essentially of $Y_2O_3$ casting refractory powder as the predominant ingredient, $V_2O_5$ in an amount sufficient that said mixture has a lower sintering temperature than said powder, and a fugitive binder in an amount sufficient to maintain the mixture in a homogeneous state; and
    applying heat to said mixture at about 2950°–3350° F. for about 2–6 hours to sinter said mixture.

5. A method for producing composition usable in a reactive metal casting slurry, the method comprising:
    forming a mixture which consists essentially of a $Y_2O_3$ casting refractory powder as the predominant ingredient, $V_2O_5$ in an amount sufficient that said mixture has a lower sintering temperature than said powder, and a fugitive binder in an amount sufficient to maintain the mixture in a homogeneous state;
    extruding said mixture into pellets;
    drying said pellets after said extruding thereof; and applying heat to said pellets in an amount sufficient to sinter said mixture.

6. A method for producing a composition usable in a reactive metal casting slurry, the method comprising:
forming a mixture which consists essentially of a $Y_2O_3$ casting refractory powder as the predominant ingredient, $V_2O_5$ in an amount sufficient that said mixture has a lower sintering temperature than said powder, and a fugitive binder in an amount sufficient to maintain the mixture in a homogeneous state;
drying said mixture;
forming said mixture into tablets after said drying thereof; and
applying heat to said tablets in an amount sufficient to sinter said mixture.

7. A method for producing a reactive metal casting slurry, the method comprising:
forming a mixture which consists essentially of a $Y_2O_3$ casting refractory powder as the predominant ingredient, $V_2O_5$ in an amount sufficient that said mixture has a lower sintering temperature than said powder, and a fugitive binder in an amount sufficient to maintain the mixture in a homogeneous state;
applying heat to said mixture in an amount sufficient to sinter said mixture;
grinding said mixture after said application of heat to form a casting flour; and
mixing said casting flour with a silicate binder in an amount sufficient to form a reactive metal casting slurry that retains its shape during firing of a mold made from said slurry.

8. The method of claim 7 wherein said first binder is selected from the group consisting of polyvinyl alcohol and methyl cellulose.

9. The method of claim 7 wherein said silicate binder has a hydrolysis level less than about 100%, but not less than about 60%, a silica level less than about 23% and a viscosity between about 5.0 and 15.0 centipoise.

10. The method of claim 7 wherein said casting flour is combined with said silicate binder in about a 7:1 weight ratio.

11. A reactive metal casting slurry made according to the method of claim 2.

12. A composition for use in making a casting flour for a reactive metal casting slurry, the composition consisting essentially of:
about 0.15–1.00% by weight $V_2O_5$, about 97.00–99.35% by weight $Y_2O_3$, and about 0.50–2.00% by weight fugitive binder.

13. The composition of claim 12 wherein said fugitive binders is selected from the group consisting of polyvinyl alcohol and methyl cellulose.

14. A method for producing a composition useable in a reactive metal casting slurry comprising:
combining $Y_2O_3$ with a sintering agent consisting essentially of $V_2O_5$;
combining said $Y_2O_3$ and said sintering agent with a fugitive binder to form a mixture consisting essentially of about 0.15–1.00% by weight sintering agent, about 97.00–99.35% by weight $Y_2O_3$, and about 0.50–2.00% by weight fugitive binder; and
applying heat to said mixture in an amount sufficient to sinter said $Y_2O_3$.

15. A composition made according to the method of claim 14.

16. A method for producing a reactive metal casting slurry comprising:
combining $Y_2O_3$ with a sintering agent consisting essentially of $V_2O_5$;
mixing said $Y_2O_3$ and said sintering agent with a fugitive binder to form a mixture consisting essentially of about 0.15–1.00% by weight sintering agent, about 97.00–99.35% by weight $Y_2O_3$, and about 0.50–2.00% byw eight fugitive binder;
applying heat to said mixture in an amount sufficient to sinter said $Y_2O_3$;
grinding said mixture after said application of heat to form a casting flour; and
mixing said casting flour with a silicate binder in an amount sufficient to form said slurry and sufficient that said slurry retains its shape during firing of a mold made from said slurry.

17. A reactive metal casting slurry made according to the method of claim 16.

18. A casting flour consisting essentially of particles that:
are of a size suitable for use in forming a reactive metal casting slurry;
are greater in average size and density than the particles in $Y_2O_3$ casting refractory powder;
are homogeneous, sintered bodies; and
individually consist essentially of 99.0–99.85% by weight $Y_2O_3$ and 0.15–1.0% by weight $V_2O_5$.

19. A reactive metal casting slurry that consists essentially of:
said casting flour of claim 18 as the predominant constituent of said slurry;
a silicate binder in an amount sufficient that said slurry retains its shape during firing of a mold made from said slurry; and
at least one viscosity adjusting substance in an amount sufficient that the slurry has a viscosity of about 5.0–15.0 and
at least one viscosity adjusting substance in an amount sufficient that the slurry has a viscosity of about 5.0–15.0 centipoise.

* * * * *

UNITED STATES PATENT AND TRADEMARK OFFICE
CERTIFICATE OF CORRECTION

PATENT NO. : 4,996,175
DATED : February 26, 1991
INVENTOR(S) : David H. Sturgis It is certified that error appears in the above-identified patent and that said Letters Patent is hereby corrected as shown below:

Column 2, line 14, "$V_2O_3$" should be --$V_2O_5$--;

Column 2, line 16, "$V_2O_3$" should be --$V_2O_5$--;

Column 2, line 48, "YITTRIUM" should be --Yttrium--;

Column 3, line 20, "Avice TM grade Ph 101)" should be --Avicel ®(grade pH 101)--;

Column 3, line 44, "encounted" should be --encountered--;

Column 3, line 47, "$V_2O_3$" should be --$V_2O_5$--;

Column 5, line 23, "then" should be --that--;

Column 6, line 58, "producing composition" should be --producing a composition--;

Column 7, lines 46, "according to claim 2" should be --according to claim 7--.

UNITED STATES PATENT AND TRADEMARK OFFICE
CERTIFICATE OF CORRECTION

PATENT NO. : 4,996,175

DATED : February 26, 1991

INVENTOR(S) : David H. Sturgis

It is certified that error appears in the above-identified patent and that said Letters Patent is hereby corrected as shown below:

Column 8, line 22, "byw eight" should read -- by weight--;

Column 8, line 49 to 51, "at least one viscosity adjusting substance in an amount sufficient that the slurry has a viscosity of about 5.0-15.0 and" should be deleted.

Signed and Sealed this

Ninth Day of March, 1993

Attest:

STEPHEN G. KUNIN

Attesting Officer

Acting Commissioner of Patents and Trademarks